（12）United States Patent
Froy et al.

(10) Patent No.: US 10,872,493 B2
(45) Date of Patent: Dec. 22, 2020

(54) AUGMENTED REALITY SYSTEMS AND METHODS FOR SPORTS RACING

(71) Applicant: IGT, Las Vegas, NV (US)

(72) Inventors: David Froy, Lakeville-Westmorland (CA); David Ryan Hannah, Lower Cloverdale (CA); Karen van Niekerk, Dieppe (CA); Fayez Idris, Dieppe (CA); David Small, Moncton (CA)

(73) Assignee: IGT, Las Vegas, NV (US)

( * ) Notice: Subject to any disclaimer, the term of this patent is extended or adjusted under 35 U.S.C. 154(b) by 29 days.

(21) Appl. No.: 15/966,101

(22) Filed: Apr. 30, 2018

(65) Prior Publication Data

US 2019/0333320 A1    Oct. 31, 2019

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |
| *G06T 19/00* | (2011.01) |
| *H04N 21/2187* | (2011.01) |

(52) U.S. Cl.
CPC ........ *G07F 17/3227* (2013.01); *G06T 19/006* (2013.01); *G07F 17/3211* (2013.01); *G07F 17/3288* (2013.01); *H04N 21/2187* (2013.01)

(58) Field of Classification Search
USPC .......................... 463/1, 5, 6, 10, 20, 22, 39
See application file for complete search history.

(56) References Cited

U.S. PATENT DOCUMENTS

| | | | |
|---|---|---|---|
| 8,142,269 B2* | 3/2012 | Tsukahara | ....................... 463/25 |
| 2001/0045978 A1* | 11/2001 | McConnell | ............. A63F 13/00 348/42 |
| 2004/0229671 A1* | 11/2004 | Stronach | ................ G06Q 50/34 463/6 |
| 2012/0269494 A1* | 10/2012 | Satyanarayana | ... H04N 21/4781 386/248 |
| 2013/0196753 A1* | 8/2013 | Miller | ................. G07F 17/3244 463/28 |

* cited by examiner

*Primary Examiner* — Adetokunbo O Torimiro
(74) *Attorney, Agent, or Firm* — Sage Patent Group

(57) ABSTRACT

A computer-implemented method includes generating a live video signal of a scene associated with a field of view of a user, wherein the scene includes a first racing element associated with a race having a plurality of race rules. The method further includes determining, based on the live video signal in real time, a first racing value for the first racing element, based on a race rule of the plurality of race rules. The method further includes displaying an indication of the first racing value within the scene to the user in real time, so that the indication is associated with the first racing element within the scene.

20 Claims, 9 Drawing Sheets

US 10,872,493 B2

AUGMENTED REALITY SYSTEMS AND METHODS FOR SPORTS RACING

FIELD

Embodiments described herein relate to augmented reality (AR) systems and methods, and in particular to AR systems and methods for sports racing.

BACKGROUND

Sport racing events, such as animal racing or auto racing, for example, have many aspects that make them attractive to spectators, both from an entertainment standpoint and a wagering and/or betting standpoint. Live racing events may be viewed in person, e.g., in a sports venue such as a racetrack or stadium, or remotely, e.g., in a casino or other environment, via a television or other video display. As technology improves and as the competition for the attention of bettors and spectators increases, there is a need for additional interactive features that increase spectator involvement and excitement.

SUMMARY

According to an embodiment, a computer-implemented method includes generating a live video signal of a scene associated with a field of view of a user, wherein the scene includes a first racing element associated with a race having a plurality of race rules. The method further includes determining, based on the live video signal in real time, a first racing value for the first racing element, based on a race rule of the plurality of race rules. The method further includes displaying an indication of the first racing value within the scene to the user in real time, so that the indication is associated with the first racing element within the scene.

According to another embodiment, a system includes a memory and a processor coupled to the memory, the processor operable to perform a method. The method includes generating a live video signal of a scene associated with a field of view of a user, wherein the scene comprises a first racing element associated with a race having a plurality of race rules. The method further includes determining, based on the live video signal in real time, a first racing value for the first racing element, based on a race rule of the plurality of race rules. The method further includes displaying an indication of the first racing value within the scene to the user in real time, so that the indication is associated with the first racing element within the scene.

According to another embodiment, a non-transitory computer-readable medium includes machine-readable instructions operable to cause a processor to perform a method. The method includes generating a live video signal of a scene associated with a field of view of a user, wherein the scene includes a first racing element associated with a race having a plurality of race rules. The method further includes determining, based on the live video signal in real time, a first racing value for the first racing element, based on a race rule of the plurality of race rules. The method further includes displaying an indication of the first racing value within the scene to the user in real time, so that the indication is associated with the first racing element within the scene.

DETAILED DESCRIPTION

Embodiments described herein relate to augmented reality (AR) systems and methods, and in particular to AR systems and methods for sports racing. According to an embodiment, a computer-implemented method includes generating a live video signal of a scene associated with a field of view of a user, wherein the scene includes a first racing element associated with a race having a plurality of race rules. The method further includes determining, based on the live video signal in real time, a first racing value for the first racing element, based on a race rule of the plurality of race rules. The method further includes displaying an indication of the first racing value within the scene to the user in real time, so that the indication is associated with the first racing element within the scene.

Figure 1:
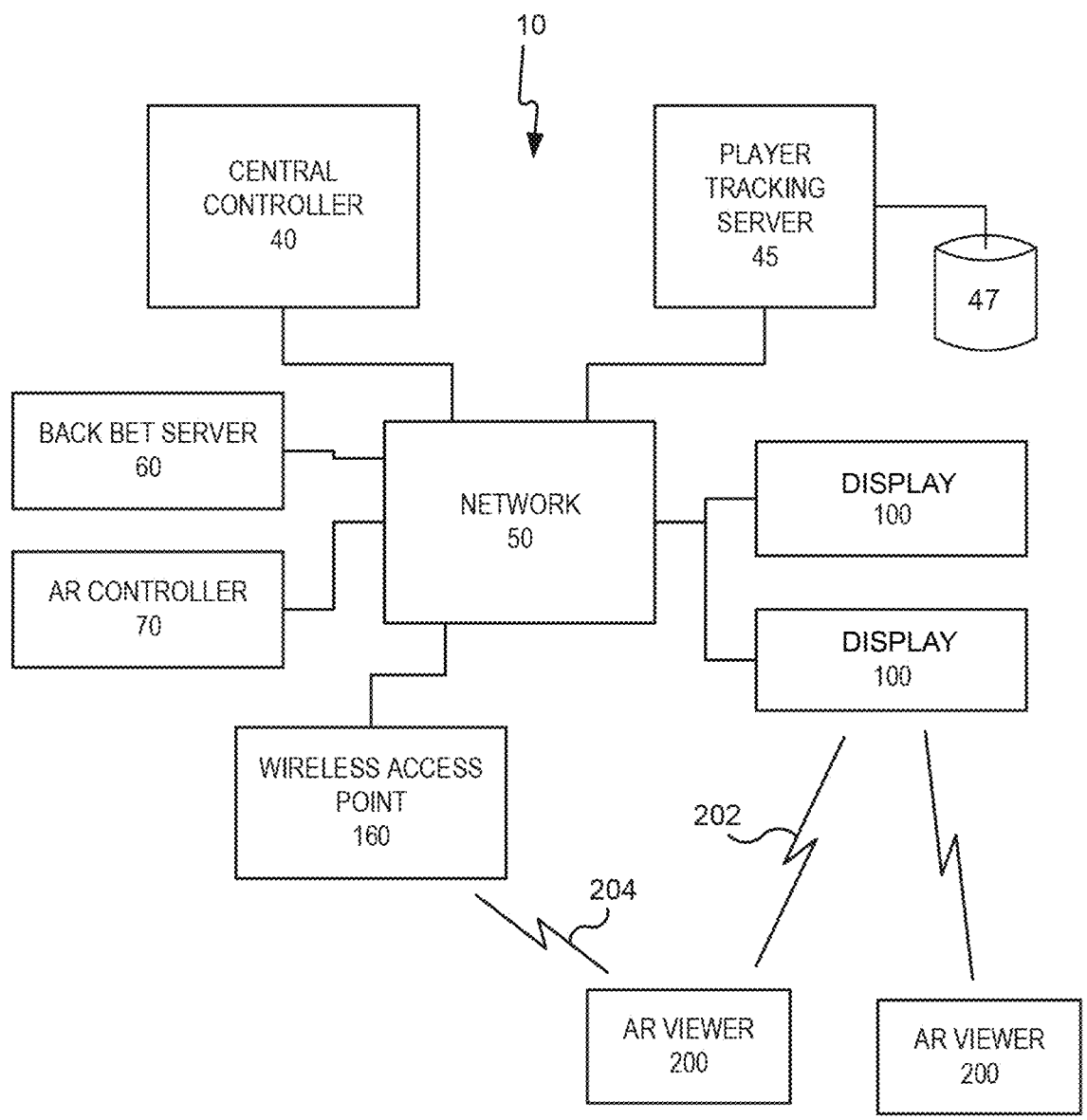
FIG. 1 is a schematic block diagram illustrating a network configuration for a plurality of gaming devices according to some embodiments.

Before discussing aspects of the embodiments disclosed herein, reference is made to FIG. 1, which illustrates a networked gaming system 10 that includes a plurality of displays 100 and AR viewers 200. The gaming system 10 may be located, for example, on the premises of a gaming establishment, such as a casino. The displays 100, which are typically situated in a casino sports and racing book or elsewhere on a casino floor, may be in communication with each other and/or at least one central controller 40 through a data network or remote communication link 50. The data communication network 50 may be a private data communication network that is operated, for example, by the gaming facility that operates the displays 100. Communications over the data communication network 50 may be encrypted for security. The central controller 40 may be any suitable server or computing device which includes at least one processor and at least one memory or storage device. Each display 100 may be a passive display, or may be a smart display that includes a processor that transmits and receives events, messages, commands or any other suitable data or signal between the displays 100 and the central controller 40. The display processor is operable to execute such communicated events, messages or commands in conjunction with the operation of the display 100. Moreover, the processor of the central controller 40 is configured to transmit and receive events, messages, commands or any other suitable data or signal between the central controller 40 and each of the individual displays 100. In some embodiments, one or more of the functions of the central controller 40 may be performed by one or more display processors. Moreover, in some embodiments, one or more of the functions of one or more display processors as disclosed herein may be performed by the central controller 40.

A wireless access point 160 provides wireless access to the data communication network 50. The wireless access point 160 may be connected to the data communication network 50 as illustrated in FIG. 1, or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, a mixed reality viewer 200, or AR viewer 200, is provided. The AR viewer 200 communicates with one or more elements of the system 10 to render two-dimensional (2D) and/or three-dimensional (3D) content to a user, e.g., a casino operations worker, in a virtual space, while at the same time allowing the casino operations worker to see objects in the real space around the user, e.g., on the casino floor. That is, the AR viewer 200 combines a virtual image with real images perceived by the user, including images of real objects. In this manner, the AR viewer 200 "mixes" real and virtual reality into a single viewing experience for the user. In some embodiments, the AR viewer 200 may be further configured to enable the user to interact with both the real and virtual objects displayed to the player by the AR viewer 200. In some embodiments, the AR viewer 200 may be replaced with a virtual reality (VR) viewer that combines a video signal of a real event with virtual reality elements to generate a single mixed reality viewing experience via a VR display.

The AR viewer 200 communicates with one or more elements of the system 10 to coordinate the rendering of mixed reality images, and in some embodiments mixed reality 3D images, to the user. For example, in some embodiments, the AR viewer 200 may communicate directly with a display 100 over a wireless interface 202, which may be a Wi-Fi link, a Bluetooth link, an NFC link, etc. In other embodiments, the AR viewer 200 may communicate with the data communication network 50 (and devices connected thereto, including displays) over a wireless interface 204 with the wireless access point 160. The wireless interface 204 may include a Wi-Fi link, a Bluetooth link, an NFC link, etc. In still further embodiments, the AR viewer 200 may communicate simultaneously with both the display 100 over the wireless interface 202 and the wireless access point 160 over the wireless interface 204. In these embodiments, the wireless interface 202 and the wireless interface 204 may use different communication protocols and/or different communication resources, such as different frequencies, time slots, spreading codes, etc. For example, in some embodiments, the wireless interface 202 may be a Bluetooth link, while the wireless interface 204 may be a Wi-Fi link.

The wireless interfaces 202, 204 allow the AR viewer 200 to coordinate the generation and rendering of mixed reality images to the user via the AR viewer 200.

In some embodiments, the gaming system 10 includes a mixed reality controller, or AR controller 70. The AR controller 70 may be a computing system that communicates through the data communication network 50 with the displays 100 and the AR viewers 200 to coordinate the generation and rendering of virtual images to one or more users using the AR viewers 200. The AR controller 70 may be implemented within or separately from the central controller 40.

In some embodiments, the AR controller 70 may coordinate the generation and display of the virtual images of the same virtual object to more than one user by more than one AR viewer 200. As described in more detail below, this may enable multiple users to interact with the same virtual object together in real time. This feature can be used to provide a shared experience to multiple users at the same time.

The AR controller 70 may store a three-dimensional wireframe map of a gaming area, such as a casino floor, and may provide the three-dimensional wireframe map to the AR viewers 200. The wireframe map may store various information about displays and other games or locations in the gaming area, such as the identity, type and location of various types of displays, games, etc. The three-dimensional wireframe map may enable an AR viewer 200 to more quickly and accurately determine its position and/or orientation within the gaming area, and also may enable the AR viewer 200 to assist the user in navigating the gaming area while using the AR viewer 200.

In some embodiments, at least some processing of virtual images and/or objects that are rendered by the AR viewers 200 may be performed by the AR controller 70, thereby offloading at least some processing requirements from the AR viewers 200. The AR viewer may also be able to communicate with other aspects of the gaming system 10, such as the player tracking server 45, a back bet server 60, or other device through the network 50.

Referring to FIGS. 2A to 2D, the AR viewer 200 may be implemented in a number of different ways. For example, referring to FIG. 2A, in some embodiments, an AR viewer 200A may be implemented as a 3D headset including a pair of semitransparent lenses 212 on which images of virtual objects may be displayed. Different stereoscopic images may be displayed on the lenses 212 to create an appearance of depth, while the semitransparent nature of the lenses 212 allow the user to see both the real world as well as the 3D image rendered on the lenses 212. The AR viewer 200A may be implemented, for example, using a Hololens™ from Microsoft Corporation. The Microsoft Hololens includes a plurality of cameras and other sensors 211 that the device uses to build a 3D model of the space around the user. The device 200A can generate a 3D image to display to the user that takes into account the real-world objects around the user and allows the user to interact with the 3D object.

The device 200A may further include other sensors, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers that allow the user to interact audially with the device.

Figure 2A:
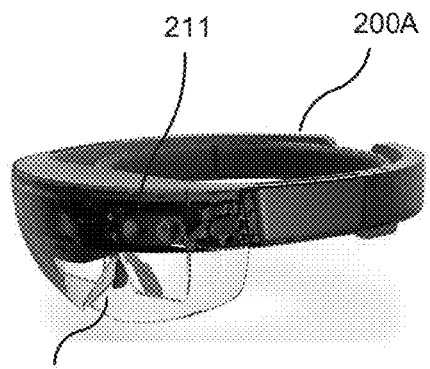
FIGS. 2A to 2D illustrate mixed reality viewers according to various embodiments.
Figure 2B:
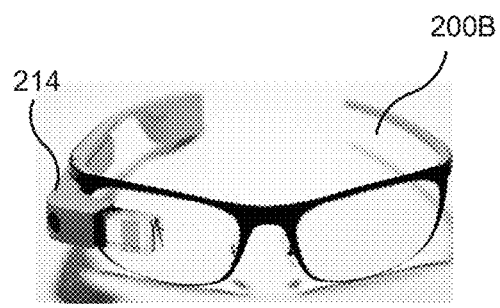

Referring to FIG. 2B, an AR viewer 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer.

Figure 2C:
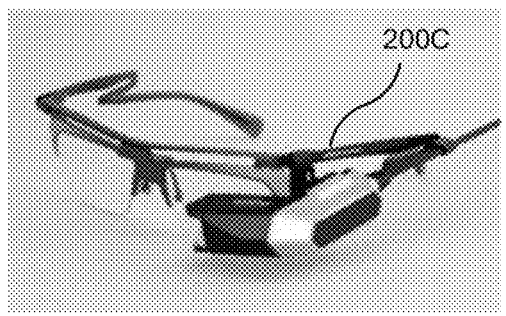
Figure 2D:
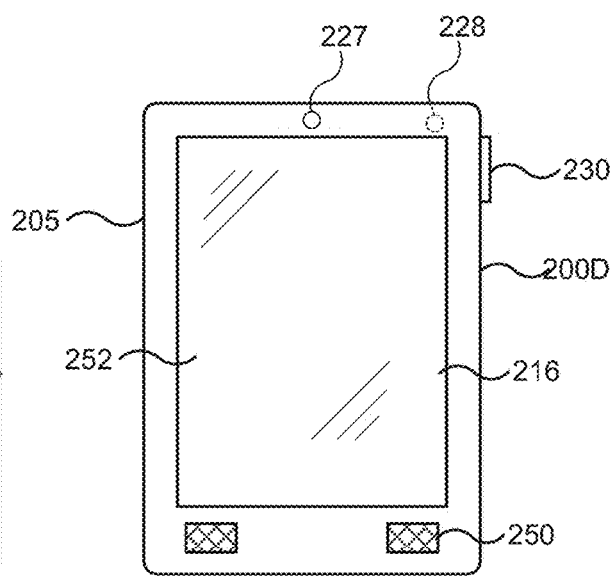

In other embodiments, referring to FIG. 2C, the AR viewer may be implemented using a virtual retinal display device 200C. In contrast to devices that display an image within the field of view of the user, a virtual retinal display raster scans an image directly onto the retina of the user. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, an AR viewer 200D may be implemented using a mobile wireless device, such as a mobile telephone, a tablet computing device, a personal digital assistant, or the like. The device 200D may be a handheld device including a housing 205 on which a touch-screen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

Figure 3A:
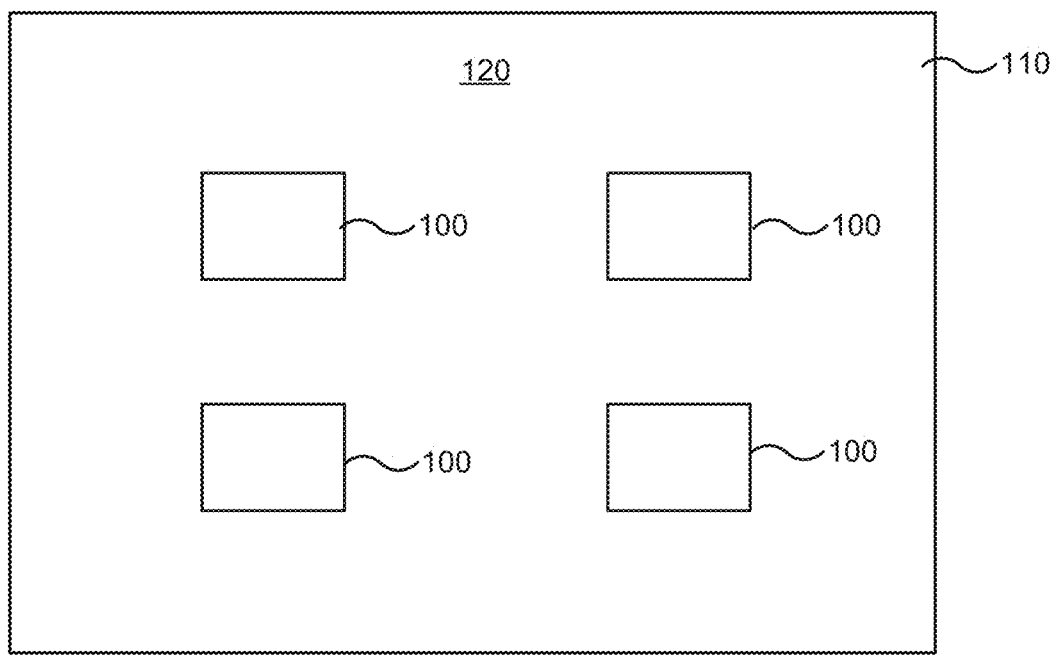
FIG. 3A is a map of a gaming area, such as a casino floor.

Referring now to FIG. 3A, an example map 110 of a gaming area 120 is illustrated in plan view. The gaming area 120 may, for example, be a casino floor. The map 110 shows the location of a plurality of displays 100 within the gaming area 120. As will be appreciated, the locations of the displays 100 and other games and objects (not shown) within a gaming area 120 are generally fixed, although a casino operator may relocate displays from time to time, within the gaming area 120. As noted above, in order to assist the operation of the AR viewers 200, the AR controller 70 may store a three-dimensional wireframe map of the gaming area 120, and may provide the three-dimensional wireframe map to the AR viewers 200.

Figure 3B:
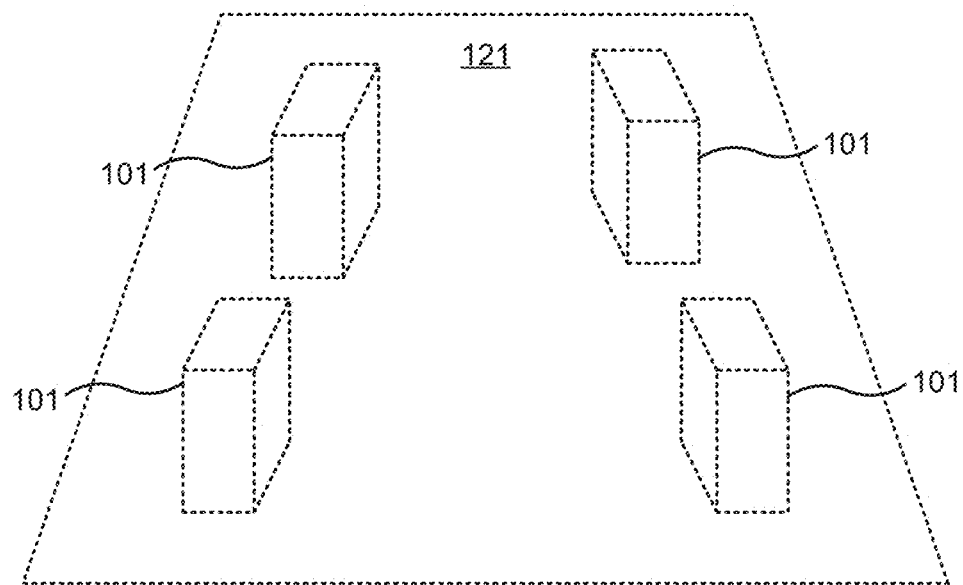
FIG. 3B is a 3D wireframe model of the gaming area of FIG. 3A.

An example of a wireframe map 121 is shown in FIG. 3B. The wireframe map is a three-dimensional model of the gaming area 120, such as a race and sports book, for example. As shown in FIG. 3B, the wireframe map 121 includes wireframe models 101 corresponding to the displays 100 that are physically in the gaming area 120. The wireframe models 101 may be pregenerated to correspond to various display form factors and sizes. The pregenerated models may then be placed into the wireframe map, for example, by a designer or other personnel. The wireframe map 121 may be updated whenever the physical location of displays in the gaming area 120 is changed.

In some embodiments, the wireframe map 121 may be generated automatically using an AR viewer 200, such as a 3D headset, that is configured to perform a three-dimensional depth scan of its surroundings and generate a three-dimensional model based on the scan results. Thus, for example, an operator using an AR viewer 200A (FIG. 2A) may perform a walkthrough of the gaming area 120 while the AR viewer 200A builds the 3D map of the gaming area.

The three-dimensional wireframe map 121 may enable an AR viewer 200 to more quickly and accurately determine its position and/or orientation within the gaming area. For example, an AR viewer 200 may determine its location within the gaming area 120 using one or more position/orientation sensors. The AR viewer 200 then builds a three-dimensional map of its surroundings using depth scanning, and compares its sensed location relative to objects within the generated three-dimensional map with an expected location based on the location of corresponding objects within the wireframe map 121. The AR viewer 200 may calibrate or refine its position/orientation determination by comparing the sensed position of objects with the expected position of objects based on the wireframe map 121. Moreover, because the AR viewer 200 has access to the wireframe map 121 of the entire gaming area 120, the AR viewer 200 can be aware of objects or destinations within the gaming area 120 that it has not itself scanned. Processing requirements on the AR viewer 200 may also be reduced because the wireframe map 121 is already available to the AR viewer 200.

In some embodiments, the wireframe map 121 may store various information about displays or other games and locations in the gaming area, such as the identity, type, orientation and location of various types of displays, the locations of exits, bathrooms, courtesy desks, cashiers, ATMs, ticket redemption machines, etc. Such information may be used by an AR viewer 200 to help the user navigate the gaming area. For example, if a user desires to find a destination within the gaming area, the user may ask the AR viewer 200 for directions using a built-in microphone and voice recognition function in the AR viewer 200 or use other hand gestures or eye/gaze controls tracked by the AR viewer 200 (instead of or in addition to voice control). The AR viewer 200 may process the request to identify the destination, and then may display a virtual object, such as a virtual path on the ground, virtual arrow, virtual sign, etc., to help the user to find the destination. In some embodiments, for example, the AR viewer 200 may display a halo or glow around the destination to highlight it for the user, or have virtual 3D sounds coming from it so users could more easily find the desired location.

According to some embodiments, a user of an AR viewer 200 may use the AR viewer to obtain information about players and/or displays on a casino gaming floor. The information may be displayed to the user on the AR viewer 200 in a number of different ways such as by displaying images on the AR viewer 200 that appear to be three dimensional or two-dimensional elements of the scene as viewed through the AR viewer 200. In general, the type and/or amount of data that is displayed to the user may depend on what type of user is using the AR viewer 200 and, correspondingly, what level of permissions or access the user has. For example, an AR viewer 200 may be operated in one of a number of modes, such as a player mode, an observer mode or an operator mode. In a player mode, the AR viewer 200 may be used to display information about particular displays on a casino floor. The information may be generic information about a display or may be customized information about the displays based on the identity or preferences of the user of the AR viewer 200. In an observer mode, the AR viewer 200 may be used to display information about particular displays on a casino floor or information about players of displays on the casino floor. In an operator mode, which is described in greater detail below, the AR viewer 200 may be used to display information about particular displays or other games on a casino floor or information about players of displays or other games on the casino floor, but the information may be different or more extensive than the information displayed to an observer or player.

Figure 4:
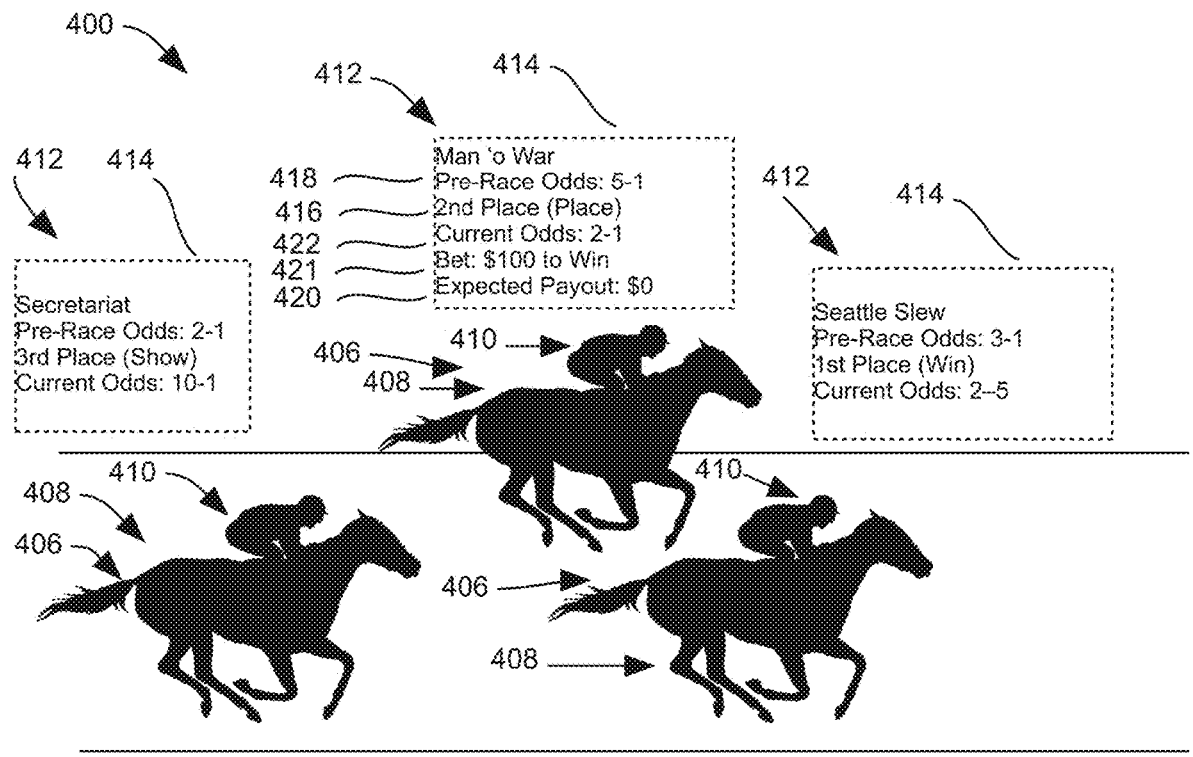
FIG. 4 is a view illustrating a user viewing a horse race using an AR viewer to view additional information associated with the race, according to an embodiment.
Figure 4:
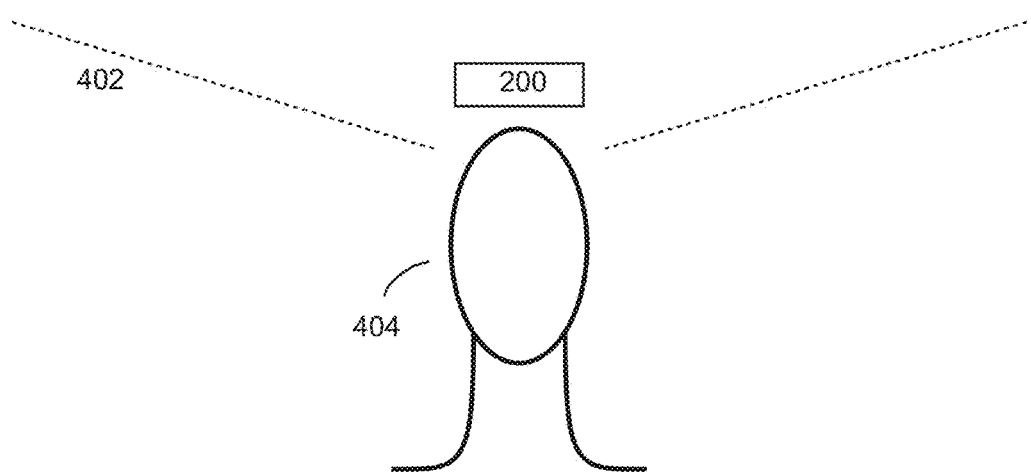

In this regard, FIG. 4 is a view illustrating a user viewing a horse race 400 using an AR viewer 200 to view additional information associated with the race 400, according to an embodiment. The AR viewer 200 generates a live video signal of a scene 402 associated with a field of view of a user 404. The scene 402 includes a first racing element 406, which is a horse 408 and a jockey 410 controlling the horse 408 in this example. The AR viewer 200 determines racing values 412 based on the rules of the race 400, and displays indications 414 of the racing values 412 within the scene 402 to the user 404 in real time, so that the indication 414 is associated with the first racing element 406 within the scene 402. In some examples, the locations of different racing elements may be determined using additional or alternative methods, such as GPS location, external camera(s), etc.

In this example, the first racing element is a horse 408 and a jockey 410 controlling the horse 408, but it should be understood that the first racing element may be other elements, including other participants or types of participants, environmental elements, or other real-world elements within the scene 402. In this example, the racing values 412 may include a racing position 416 of the race participant, pre-race odds 418 for the race participant, expected payout 420 for a wager 421 placed by the user 404, or other information. For example, the expected payout 420 may be calculated by determining the value of a wager 421 placed by the user 404 and comparing the value of the wager 421 to the pre-race odds 418 (or other odds if the user 404 placed the wager at a different time, i.e., during the race, or with different win conditions).

Figure 5:
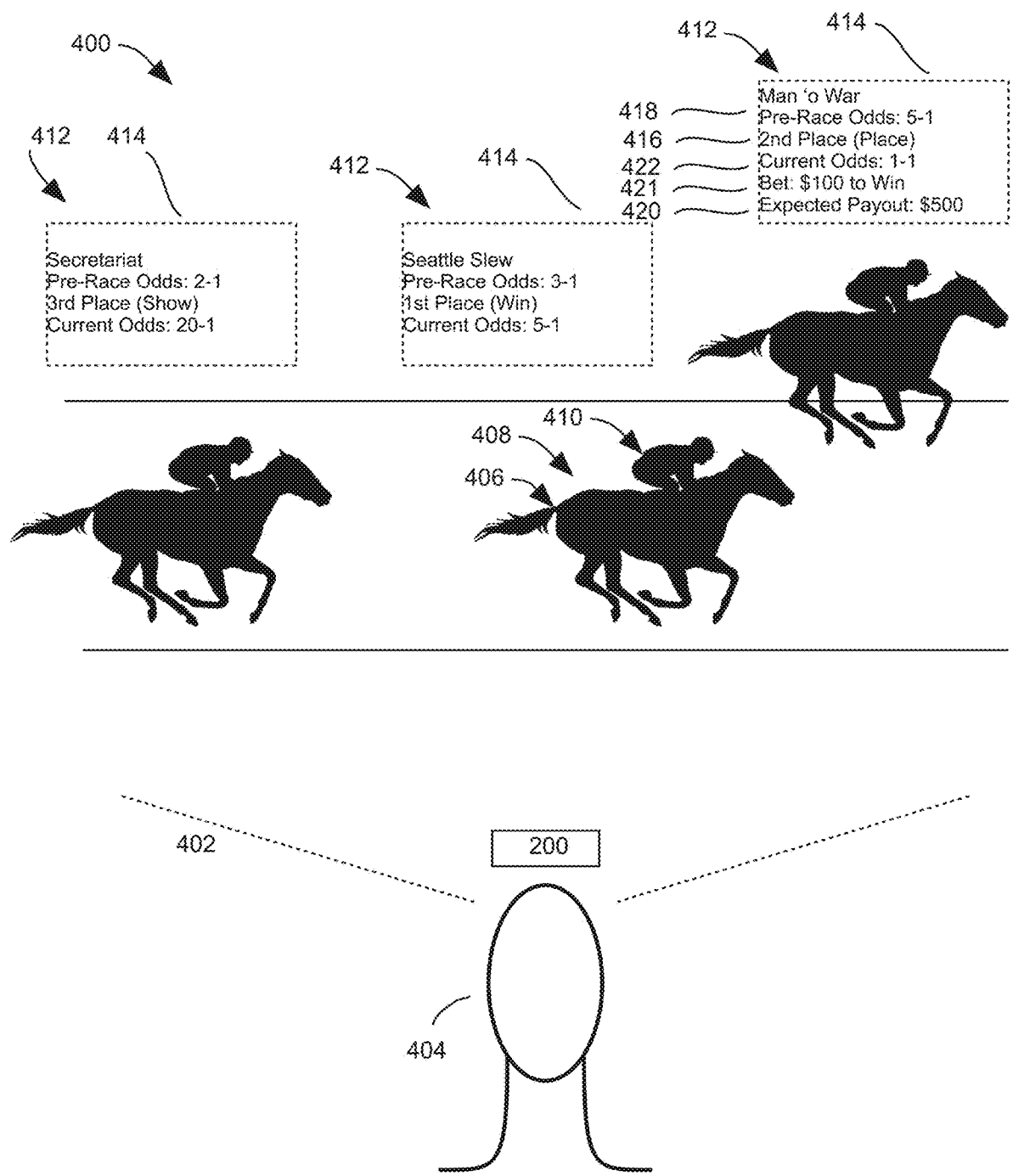
FIG. 5 is a view illustrating the user viewing the horse race of FIG. 4 at a later time during the race using an AR viewer to view updated information associated with the race, according to an embodiment.

As shown by FIG. 5, the racing values 412 and indications 414 can be updated in real time as the race 400 progresses. For example, the current odds 422 for the participant to win the race 400 may be displayed next to the pre-race odds 418. The current odds 422 may be determined by the AR viewer 200 in real time based on the live video signal and the race rules, and the indication may be updated accordingly in real time to reflect the current odds 422. It should be understood that these features may be used for other types of racing events. For example, instead of representing a horse and jockey, the racing element 406 may represent an automobile, e.g., a racecar, and a driver driving the automobile, for example. Other types of races may include dog races, harness racing, and others.

Figure 6:
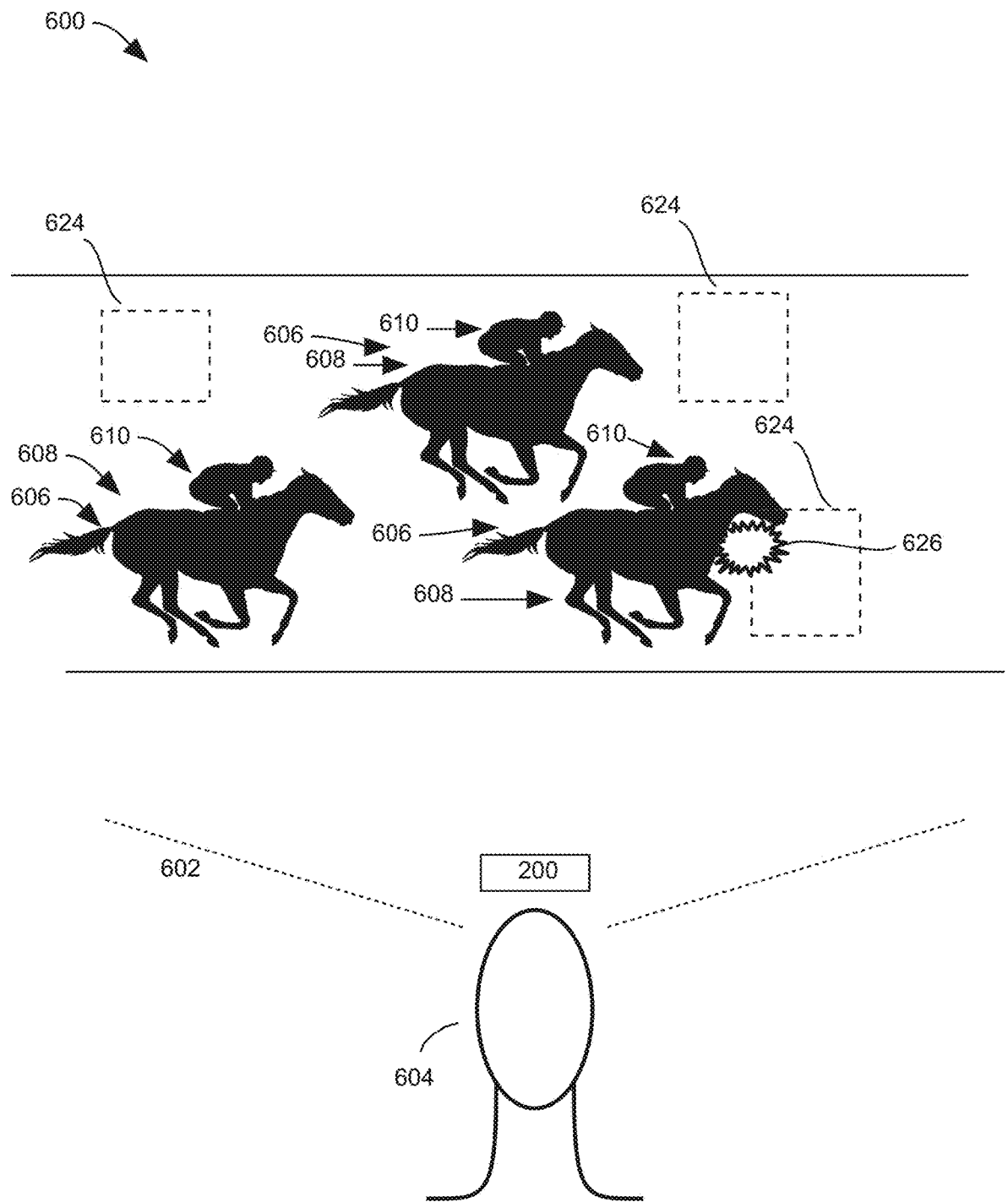
FIG. 6 is a view illustrating a user viewing a horse race using an AR viewer to view virtual racing elements within the scene, according to an embodiment.

In some embodiments, the AR viewer 200 may display virtual racing elements that are not part of the real-world scene, but that interact with the real-world racing elements under the rules of the race. In this regard, FIG. 6 is a view illustrating a user 604 viewing a horse race 600 using an AR viewer 200 to view virtual racing elements 624 within the scene 602, according to an embodiment. The virtual racing elements 624, which are virtual obstacles in this embodiment, are displayed within the scene 602 by the AR viewer 200 in real time so that the virtual racing elements 624 appear to the user 604 to be physical elements, e.g., real world elements, within the scene 602. In other examples, the virtual racing elements 624 may be virtual racers, such as a horse and jockey competing in a different race, either simultaneously with the race at a different location (e.g., live) or in a previous race at the same location or a different location.

In the example, of FIG. 6, a position of the first racing element 606, e.g., a horse 608 and jockey 610, and a position of the virtual racing element 624 within the scene 602 are determined by the AR viewer 200. Based on these determined positions, the AR viewer 200 determines whether an interaction 626 is occurring or will occur between the real-world first racing element 606 and the virtual racing element 624 within the scene 602. Upon the AR viewer 200 determining that an interaction 626 between the real-world first racing element 606 and the virtual racing element 624 has occurred (or has not occurred), a racing value 614, e.g., a point or monetary reward or penalty, is then determined based on the interaction 626 (or lack of interaction). In this example, the interaction 626 is a virtual collision between the real-world first racing element 606 and the virtual racing element 624.

Figure 7:
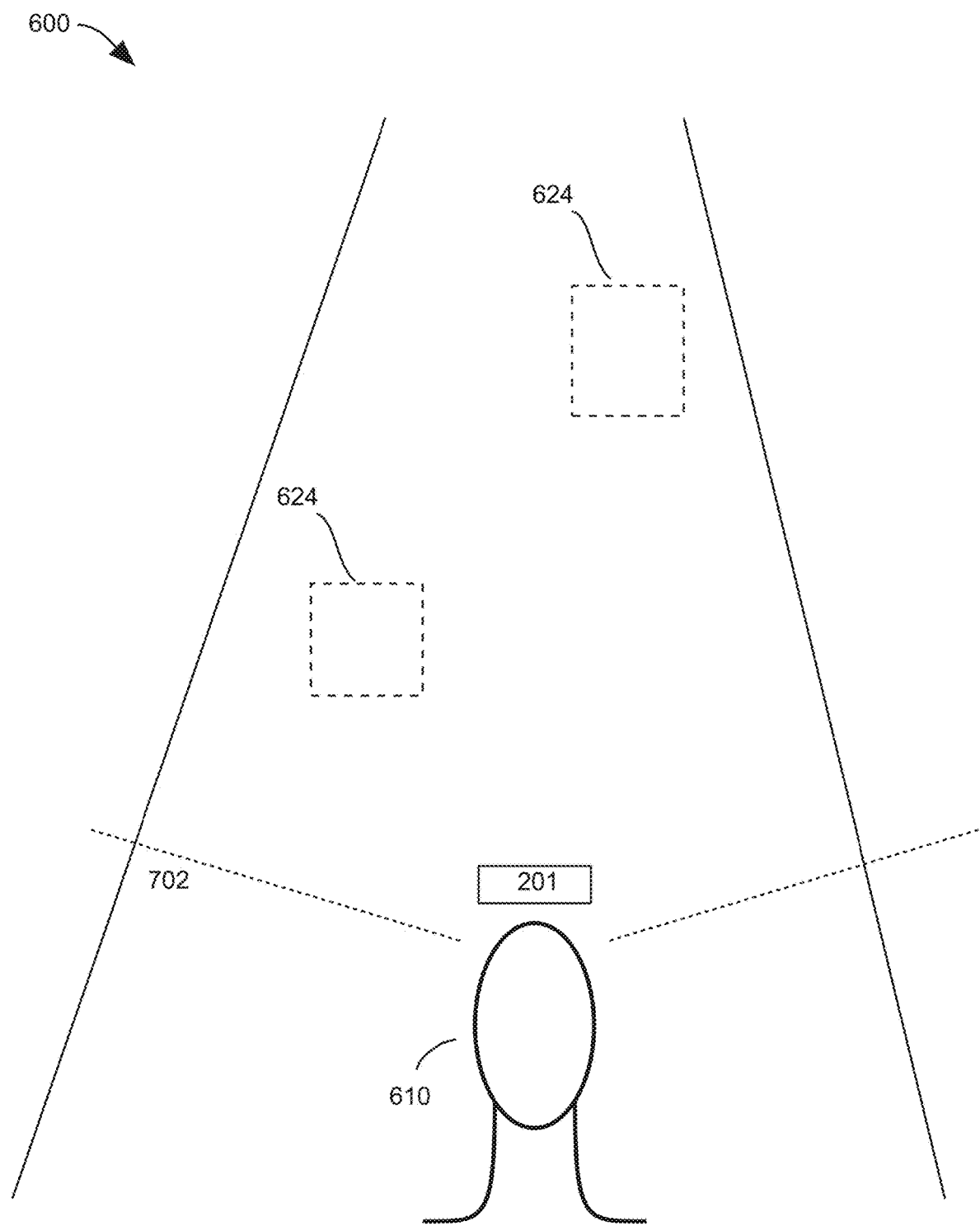
FIG. 7 is a view illustrating the horse race and virtual racing elements of FIGS. 5A and 5B from the point of view of a jockey controlling the horse, according to an embodiment.

In some embodiments, the participant, e.g., the driver or jockey, etc., may be have the capability to perceive the virtual racing element as well. In this regard, FIG. 7 is a view illustrating the horse race 600 and virtual racing elements 624 of FIGS. 6A and 6B from the point of view of the jockey 610 controlling the horse 608 (not shown), according to an embodiment. In this example, the jockey 610 is wearing his or her own AR viewer 201, which generates a live video signal of scene 702 being viewed by the jockey 610 based on a field of view 704 of the jockey 610. The virtual racing element 624, e.g. obstacle to be avoided, is displayed to the jockey 610 in real time within the scene 702, so that the virtual racing element 624 appears to be a physical, real-world element within the scene 702 corresponding to the same virtual physical element being viewed by the user 604 of FIGS. 6A and 6B.

Figure 8:
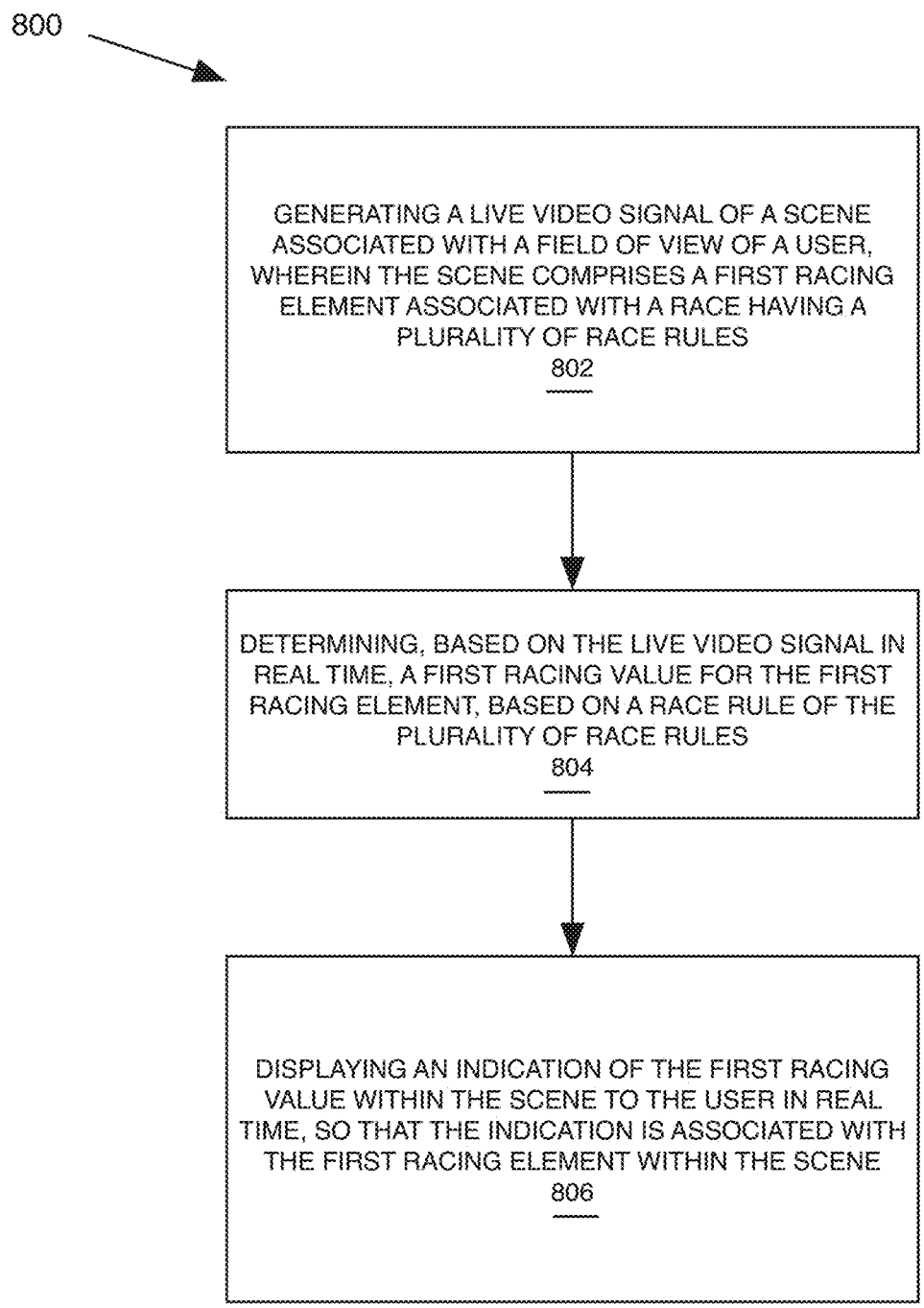
FIG. 8 is a flowchart diagram of a method of using an AR viewer to view racing values associated with a race, according to an embodiment.

These and other examples may be implemented through one or more computer-implemented methods. In this regard, FIG. 8 is a flowchart diagram of a method 800 of using an AR viewer to view racing values associated with a race, according to an embodiment. In this embodiment, the method 800 includes generating a live video signal of a scene associated with a field of view of a user, wherein the scene comprises a first racing element associated with a race having a plurality of race rules (Block 802). The method 800 further includes determining, based on the live video signal in real time, a first racing value for the first racing element, based on a race rule of the plurality of race rules (Block 804). The method further includes displaying an indication of the first racing value within the scene to the user in real time, so that the indication is associated with the first racing element within the scene (Block 806).

Figure 9:
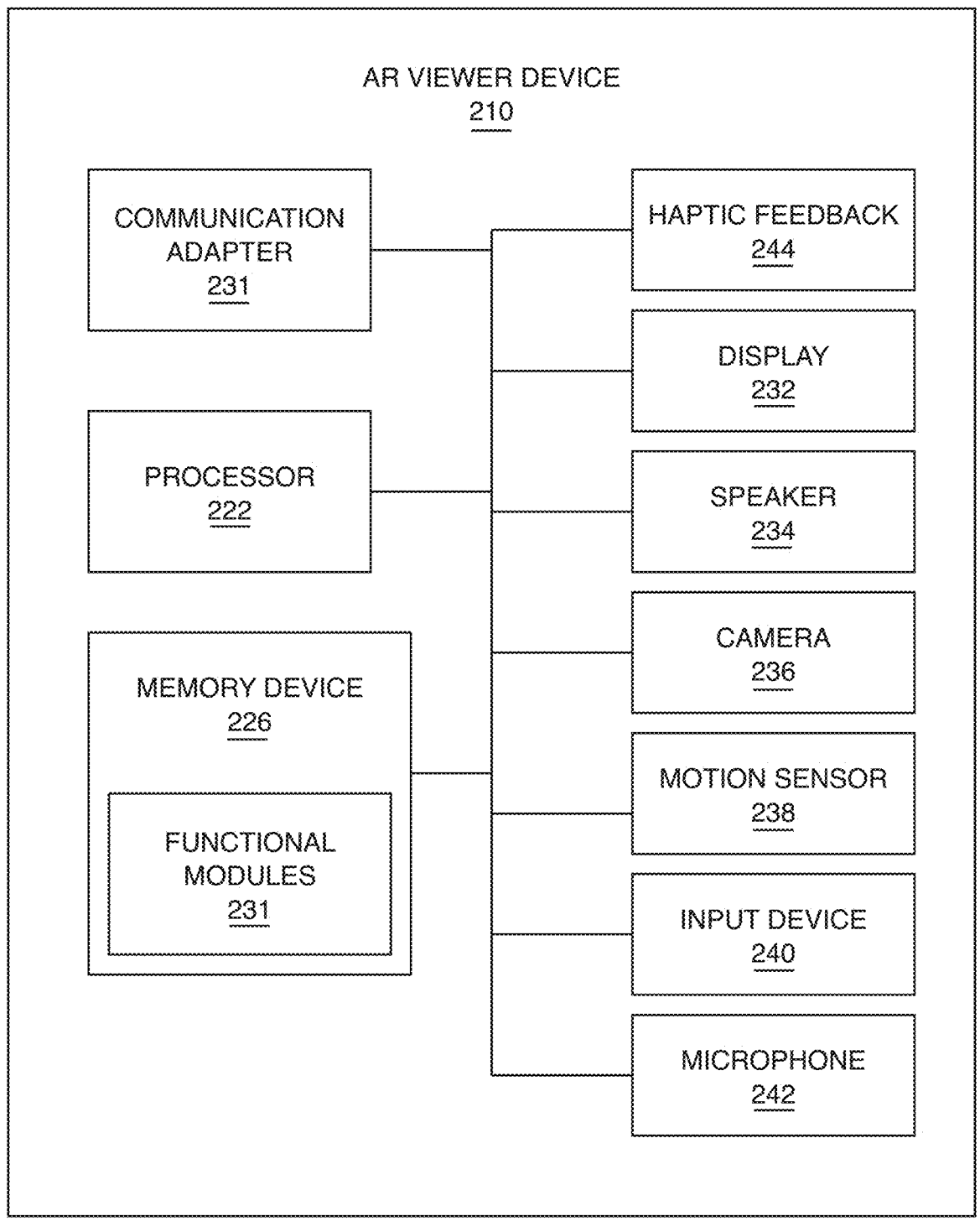
FIG. 9 is a block diagram that illustrates various components of an AR viewer device according to some embodiments.

Reference is now made to FIG. 9, which is a block diagram that illustrates various components of an AR viewer device 210, which may embody or include the AR viewer 200, discussed above, according to some embodiments. As shown in FIG. 9, the AR viewer device 210 may include a processor 222 that controls operations of the AR viewer device 210. Although illustrated as a single processor, multiple special purpose and/or general-purpose processors and/or processor cores may be provided in the AR viewer device 210. For example, the AR viewer device 210 may include one or more of a video processor, a signal processor, a sound processor and/or a communication controller that performs one or more control functions within the AR viewer device 210. The processor 222 may be variously referred to as a "controller," "microcontroller," "microprocessor" or simply a "computer." The processor 222 may further include one or more application-specific integrated circuits (ASICs).

Various components of the AR viewer device 210 are illustrated in FIG. 9 as being connected to the processor 222.

It will be appreciated that the components may be connected to the processor 222 and/or each other through one or more busses 224 including a system bus, a communication bus and controller, such as a USB controller and USB bus, a network interface, or any other suitable type of connection.

The AR viewer device 210 further includes a memory device 226 that stores one or more functional modules 231 for performing the operations described above. Alternatively, or in addition, some of the operations described above may be performed by other devices connected to the network, such as the network 50 of the system 10 of FIG. 1, for example. The AR viewer device 210 may communicate with other devices connected to the network to facilitate performance of some of these operations. For example, the AR viewer device 210 may communicate and coordinate with certain displays to identify elements of a race being displayed by a particular display.

The memory device 226 may store program code and instructions, executable by the processor 222, to control the AR viewer device 210. The memory device 226 may include random access memory (RAM), which can include non-volatile RAM (NVRAM), magnetic RAM (ARAM), ferro-electric RAM (FeRAM) and other forms as commonly understood in the gaming industry. In some embodiments, the memory device 226 may include read only memory (ROM). In some embodiments, the memory device 226 may include flash memory and/or EEPROM (electrically erasable programmable read only memory). Any other suitable magnetic, optical and/or semiconductor memory may operate in conjunction with the gaming device disclosed herein.

The AR viewer device 210 may include a communication adapter 231 that enables the AR viewer device 210 to communicate with remote devices, such as the wireless network, another AR viewer device 210, and/or a wireless access point, over a wired and/or wireless communication network, such as a local area network (LAN), wide area network (WAN), cellular communication network, or other data communication network, e.g., the network 50 of FIG. 1.

The AR viewer device 210 may include one or more internal or external communication ports that enable the processor 222 to communicate with and to operate with internal or external peripheral devices, such as displays 232, speakers 234, cameras 236, sensors, such as motion sensors 238, input devices 240, such as buttons, switches, keyboards, pointer devices, and/or keypads, mass storage devices, microphones 242, haptic feedback devices 244 and wireless communication devices. In some embodiments, internal or external peripheral devices may communicate with the processor through a universal serial bus (USB) hub (not shown) connected to the processor 222. Although illustrated as being integrated with the AR viewer device 210, any of the components therein may be external to the AR viewer device 210 and may be communicatively coupled thereto. Although not illustrated, the AR viewer device 210 may further include a rechargeable and/or replaceable power device and/or power connection to a main power supply, such as a building power supply.

In some embodiments, the AR viewer device 210 may include a head mounted device (HMD) and may include optional wearable add-ons that include one or more sensors and/or actuators. Including ones of those discussed herein. The AR viewer device 210 may be a head-mounted augmented-reality (AR) (also referred to as mixed-reality) device configured to provide elements of the SVE as part of a real-world scene being viewed by the user wearing the AR viewer device 210.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/" Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A computer-implemented method comprising:
generating a live video signal of a scene associated with a field of view of a user, wherein the scene comprises a first racing element associated with a race having a plurality of race rules;
determining, based on the live video signal in real time before a start time of the race, a first racing value for the first racing element, based on a race rule of the plurality of race rules, wherein determining the first racing value for the first racing element comprises determining pre-race odds associated with the first racing element in real time;
displaying an indication of the pre-race odds within the scene in real time before the start time of the race at an augmented reality display device being worn by the user, so that the indication is associated with the first racing element within the scene;
determining, based on the live video signal in real time during the race after the start time of the race, a second racing value for the first racing element, based on the race rule of the plurality of race rules, wherein determining the second racing value for the first racing element comprises determining current odds associated with the first racing element in real time; and
displaying, at the augmented reality display device, an indication of the current odds within the scene in real time after the start time of the race, so that the indication is associated with the first racing element within the scene.

2. The method of claim 1, wherein the first racing element is a race participant, and
wherein determining the second racing value for the first racing element comprises determining a racing position of the race participant in real time during the race.

3. The method of claim 2, wherein the race participant comprises a horse and a jockey controlling the horse.

4. The method of claim 2, wherein the race participant comprises an automobile and a driver driving the automobile.

5. The method of claim 1, further comprising:
determining, based on the live video signal in real time after the start time of the race, updated current odds for the first racing element to win the race, based on the current odds and the race rule of the plurality of race rules; and updating, in real time, the indication of the current odds associated with the first racing element within the scene to indicate the updated current odds.

6. The method of claim 1, further comprising
determining a wager value based on a wager placed by the user; and
determining a payout value in real time based on the wager value and the first racing value associated with the first racing element.

7. The method of claim 1, further comprising:
determining, based on the live video signal in real time, a virtual racing element; and
displaying the virtual racing element within the scene to the user in real time, so that the virtual racing element appears to the user to be a physical element within the scene.

8. The method of claim 7, wherein determining the second racing value for the first racing element comprises:
determining a first position of the first racing element within the scene;
determining a second position of the virtual racing element within the scene;
determining an interaction between the first racing element and the virtual racing element within the scene during the race based on the first position of the first racing element and the second position of the virtual racing element within the scene; and
determining the second racing value based on the interaction between the first racing element and the virtual racing element within the scene.

9. The method of claim 8, wherein determining an interaction between the first racing element and the virtual racing element within the scene comprises determining a collision between the first racing element and the virtual racing element.

10. The method of claim 8, wherein the first racing element is a race participant, and
wherein determining the first position of the first racing element within the scene comprises determining a position of the race participant within the scene.

11. The method of claim 10, wherein the scene associated with the field of view of the user is a first scene, the method further comprising:
generating a second live video signal of a second scene associated with a field of view of the race participant; and
displaying, at a second display device, the virtual racing element within the second scene to the race participant in real time, so that the virtual racing element appears to the race participant to be a physical element within the second scene corresponding to the physical element within the first scene.

12. A system comprising:
a memory; and
a processor circuit coupled to the memory, the memory comprising machine-readable instructions that, when executed by the processor circuit, cause the processor circuit to:
generate a live video signal of a scene associated with a field of view of a user, wherein the scene comprises a first racing element associated with a race having a plurality of race rules;
determine, based on the live video signal in real time before a start time of the race, a first racing value for the first racing element, based on a race rule of the plurality of race rules, wherein determining the first racing value for the first racing element comprises
determining pre-race odds associated with the first racing element in real time;
display, at an augmented reality display device, an indication of the pre-race odds within the scene to the user in real time before the start time of the race, so that the indication is associated with the first racing element within the scene;
determine, based on the live video signal in real time after the start time of the race, a second racing value for the first racing element, based on the race rule of the plurality of race rules, wherein determining the second racing value for the first racing element comprises determining current odds associated with the first racing element in real time; and
display, at the augmented reality display device, an indication of the current odds within the scene to the user in real time after the start time of the race, so that the indication is associated with the first racing element within the scene.

13. The system of claim 12, wherein the instructions further cause the processor circuit to:
determine, based on the live video signal in real time, a virtual racing element; and
display the virtual racing element within the scene to the user in real time, so that the virtual racing element appears to the user to be a physical element within the scene.

14. The system of claim 12, wherein the instructions further cause the processor circuit to:
determine, based on the live video signal in real time after the start time of the race, updated current odds for the first racing element to win the race, based on the current odds and the race rule of the plurality of race rules; and
updating, in real time, the indication of the current odds associated with the first racing element within the scene to indicate the updated current odds.

15. The system of claim 12, wherein the first racing element is a race participant, and
wherein the instructions that cause the processor circuit to determine the second racing value for the first racing element further cause the processor circuit to determine a racing position of the race participant in real time during the race.

16. The system of claim 12, wherein the instructions further cause the processor circuit to:
determine, based on the live video signal in real time, a virtual racing element; and
display the virtual racing element within the scene to the user in real time, so that the virtual racing element appears to the user to be a physical element within the scene.

17. The system of claim 16, wherein the instructions that cause the processor circuit to determine the second racing value for the first racing element further cause the processor circuit to:
determine a first position of the first racing element within the scene;
determine a second position of the virtual racing element within the scene;
determine an interaction between the first racing element and the virtual racing element within the scene during the race based on the first position of the first racing element and the second position of the virtual racing element within the scene; and
determine the second racing value based on the interaction between the first racing element and the virtual racing element within the scene.

18. A system comprising:

a memory; and a processor circuit coupled to the memory, the memory comprising machine-readable instructions that cause the processor circuit to:

generate a live video signal of a first scene associated with a field of view of a spectator of a race, wherein the first scene comprises a first racing element associated with the race;

determine, based on the live video signal in real time, a virtual racing element;

display the virtual racing element within the first scene in real time at a first augmented reality display device associated with the spectator, so that the virtual racing element appears to the spectator to be a physical element within the first scene;

generate a second live video signal of a second scene associated with a field of view of a participant in the race; and display the virtual racing element within the second scene in real time at a second augmented reality display device associated with the participant, so that the virtual racing element appears to the participant to be a physical element within the second scene corresponding to the physical element within the first scene.

19. The system of claim 18, wherein the instructions that cause the processor circuit to display the virtual racing element within the first scene further cause the processor circuit to:

determine a first virtual position within the first scene with respect to a position of the first racing element within the first scene; and display the virtual racing element at the first virtual position within the first scene; and wherein the instructions that cause the processor circuit to display the virtual racing element within the first scene further cause the processor circuit to:

determine a second virtual position within the second scene with respect to a position of the first racing element within the second scene, wherein the first virtual position corresponds to the second virtual position; and display the virtual racing element at the second virtual position within the second scene.

20. The system of claim 18, wherein the virtual racing element comprises a virtual participant in the race.

* * * * *